_United States Patent Office_ 3,441,414
Patented Apr. 29, 1969

3,441,414
PRODUCTION OF PHOTOGRAPHIC COLOR IMAGES UTILIZING PYRAZOLONE COLOR COUPLERS
Raphael Karel Van Poucke, Mechelen, and Arthur Henri De Cat and Marcel Jacob Monbaliu, Mortsel-Antwerp, Belgium, assignors to Gevaert Photo-Producten N.V., Mortsel, Belgium, a Belgian company
No Drawing. Filed Jan. 28, 1965, Ser. No. 428,835
Claims priority, application Belgium, Jan. 30, 1964, 43,368
Int. Cl. G03c 7/34
U.S. Cl. 96—100                    4 Claims

ABSTRACT OF THE DISCLOSURE

Color couplers are described having the general formula:

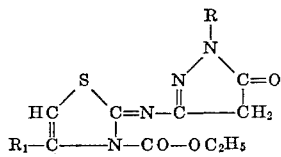

wherein:

R represents a substituted aryl radical such as a substituted phenyl radical, e.g., a phenyl radical substituted with a halogen, a phenyloxy group, an alkyl, or a N-dialkylsulphonamido group, and
$R_1$ is an aliphatic radical containing from about 5 to 20 carbon atoms.

The color couplers are particularly suited for the production of negative color images when developed with aromatic primary amino developing agents.

---

The invention relates to a process for the production of photographic color images wherein a color coupler of the pyrazolone type is used, to color couplers employed in this process, to photographic material comprising such color coupler and to photographic color images obtained therewith.

In our U.S. patent specification 2,672,417, filed Dec. 27, 1950, a class of pyrazolone color couplers has been described, which correspond to the following general formula:

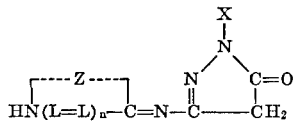

wherein:

X represents a hydrogen atom, an alkyl radical, a substituted alkyl radical, an aryl radical, a substituted aryl radical, an acyl radical, a substituted acyl radical, a heterocyclic radical or a substituted heterocyclic radical,
Z represents the atoms necessary for completing a heterocyclic ring,
L represents a methine group or a substituted methine group, and
n is 0 or 1.

It has been found now that on color development with aromatic primary amino developing agents magenta dyes that are especially interesting for the production of negative color images can be formed with substances of the above class, which more particularly comply with the following general formula:

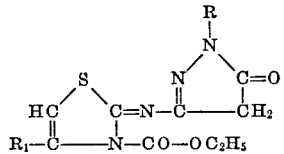

wherein:

R represents a substituted aryl radical such as a substituted phenyl radical, e.g., a phenyl radical substituted with a halogen, a phenyloxy group, an alkyl, or a N-dialkylsulphonamido group, and
$R_1$ represents an organic substituent comprising a radical that renders fast to diffusion such as an aliphatic radical with 5 to 20 carbon atoms, occasionally together with a group that renders soluble in water such as a carboxyl group.

The substituent $R_1$ is preferably a D—Z—Ar radical wherein D represents an aliphatic radical with a linear chain having 5 to 20 carbon atoms such as a n-hexadecyl radical, a n-pentadecyl radical, or a 1-carboxymethylene heptadecene-3-yl radical, Z represents a chemical bond, an oxygen atom, a sulphur atom, a sulphonyl group, a —$SO_2NH$— group, or a —$CONH$— group, and Ar represents an arylene radical such as a phenylene radical occasionally substituted with a group that improves the solubility in water, e.g., a carboxyl group.

Specific examples of $R_1$ substituents are, i.a., a p,n-hexadecyl-substituted phenyl radical, a p,n-hexadecyloxy-substituted phenyl radical, a p,n-hexadecylthio-substituted phenyl radical, a p-palmitoylamino-substituted phenyl radical and a 1-carboxymethylene heptadecene-3-yl-carbonamido-substituted phenyl radical.

The magenta dyes formed with color couplers according to the present invention by color development with aromatic primary amino developing agents such as p-phenylenediamine and its derivatives show a very low side-absorption in the red and the blue region. The absorption maximum of these dyes lies at 560 m$\mu$. Owing to the low side-absorption in the red and blue region, these dyes are especially suited for use in negative color material.

Color couplers according to the present invention can be prepared according to the following reaction scheme:

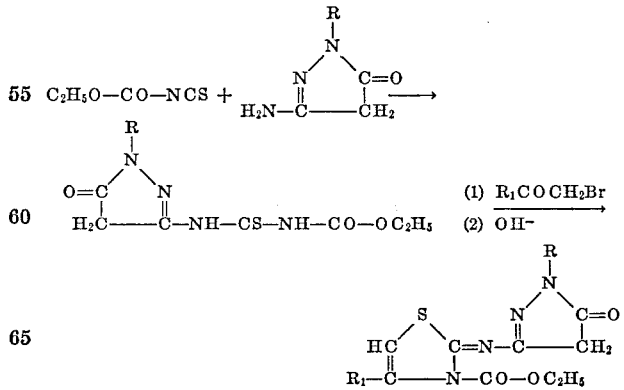

wherein R and $R_1$ have the same significance as stated hereinbefore.

By way of illustration detailed examples of preparations will be given hereinafter.

PREPARATION 1

The color coupler with the structural formula

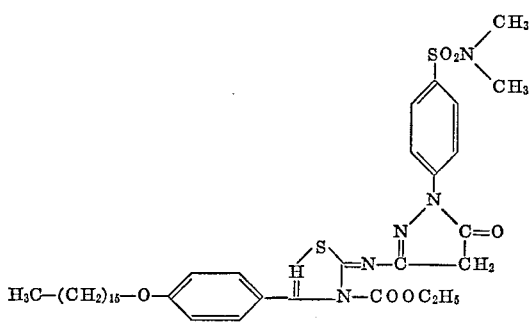

is prepared as follows.

(a) p,n-hexadecyloxyacetophenone 112 g. of potassium hydroxide and 272 g. of p-hydroxyacetophenone are dissolved while stirring in 800 cc. of ethylene glycol monomethyl ether. The resulting solution is heated at 90° C. and 610 g. of n-hexadecyl bromide are added. The reaction mixture is then heated for 1 hr. at boiling temperature. Subsequently 500 cc. of ethylene glycol monomethyl ether are distilled off and the residue is poured out in 2.5 l. of water. After drying the grainy white precipitate is recrystallised from 2 l. of acetone. Yield: 600 g. of white laminated crystals. Melting point: 63–64° C.

(b) p,n-hexadecyloxyphenacyl bromide 144 g. of p,n-hexadecyloxyacetophenone are dissolved while heating in 560 cc. of ether. 1.4 g. of aluminum chloride is added to the resulting solution and subsequently 64 g. of bromine are added dropwise at 30° C. in 30 min. The formed p,n-hexadecyloxyphenacyl bromide settles, is then kept overnight, filtered off, washed with ether and recrystallised from 2 l. of ethanol. Yield: 144 g. Melting point: 74° C.

(c) 1 - (p - dimethylsulphamoylphenyl) - 3{[3' - carbethoxy - 4' - (p,n - hexadecyloxyphenyl)-2-thiazolylidene]-amino}-5-pyrazolone 1 - (p - dimethylsulphamoylphenyl) - 3 - N - carbethoxythioureido-5-pyrazolone is obtained by allowing 35 g. of 1-(p-dimethylsulphamoylphenyl)-3-amino-5-pyrazolone to react with 16 g. of carbethoxyisothiocyanate in acetonitrile. Melting point: 244° C.

20.7 g. of 1-(p-dimethylsulphamoylphenyl)-3-N-carbethoxythioureido-5-pyrazolone suspended in 200 cc. of anhydrous acetonitrile and 22 g. of p,n-hexadecyloxyphenacyl bromide are boiled for 2 hrs. A precipitate consisting of the hydrobromide of the color coupler is formed.

After setting free with pyridine and recrystallising twice from ethanol the color coupler is obtained in the form of white crystals. Melting point: 92° C.

PREPARATION 2

The color coupler with the structural formula

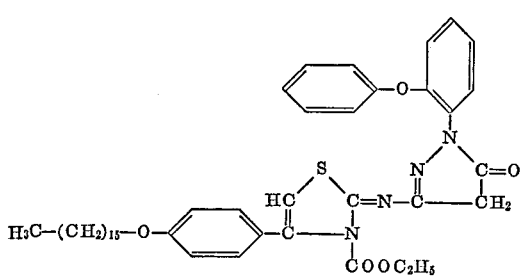

is prepared as follows.

3 g. of 1-(o-phenoxyphenyl)-3-amino-5-pyrazolone and 2 g. carbethoxyisothiocyanate are allowed to react in 20 cc. of methylene chloride. The resulting 3-N-carbethoxythioureido-derivative has a melting point of 188° C.

By condensation of this derivative with p,n-hexadecyloxyphenacyl bromide and after setting free of the hydrobromide with pyridine and recrystallisation from ethanol the color coupler is obtained as a microcrystalline powder. Melting point: 90° C.

PREPARATION 3

The color coupler with the structural formula

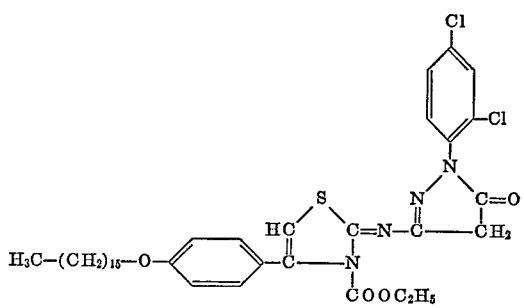

is prepared as follows.

The preparation of 1-(2,4-dichlorophenyl)-3-N-carbethoxythioureido-5-pyrazolone with a melting point of 174° C. after recrystallisation from acetonitrile is performed in the manner of the preparation of 1-(p-N-dimethylsulphonamidophenyl) - 3 - N - carbethoxythioureido-5-pyrazolone described under (c) of Preparation 1. A white crystalline product is obtained after recrystallisation from acetic acid.

By condensation of said thioureido derivative with p,n-hexadecyloxyphenacyl bromide, setting free of the resulting hydrobromide and recrystallisation from isopropyl ether the color coupler is obtained. Melting point: 134° C.

PREPARATION 4

The color coupler with the structural formula

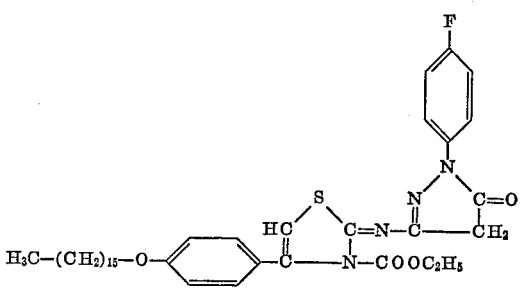

is prepared as follows.

1 - (p - fluorophenyl) - 3 - N - carbethoxythioureido-5-pyrazolone is prepared starting from 1-(p-fluorophenyl)-3-amino-5-pyrazolone and carbethoxyisocyanate, similarly to the preparation of the 1-(p-N-dimethylsulphonamidophenyl)-3-N-carbethoxythioureido-5-pyrazolone described in (c) of Preparation 1. A white crystalline product is obtained after recrystallisation from acetic acid.

By condensation of the ureido derivative with p,n-hexadecylphenacyl bromide in absolute ethanol, setting free of the obtained hydrobromide and after recrystallisation from ethanol the color coupler is obtained as a white crystalline product. Melting point: 80° C.

PREPARATION 5

The color coupler with the structural formula

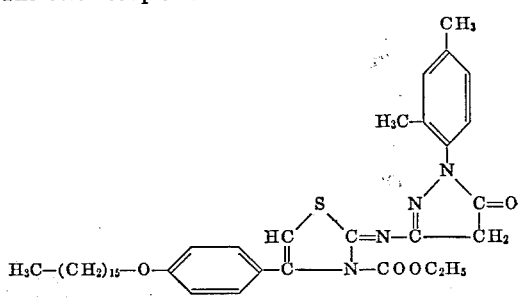

is prepared as follows.

1 - (2,4 - dimethylphenyl) - 3 - N - carbethoxythioureido-5-pyrazolone (melting point: 166° C. after recrystallisation from toluene) is prepared analogously to the 1-(p - N - dimethylsulphonamidophenyl) - 3 - N - carbethoxythioureido-5-pyrazolone from preparation 1.

The color coupler is obtained as a white crystalline product by condensation of the ureido derivative with p,n-hexadecyloxyphenacyl bromide and setting free of the hydrobromide with pyridine. Melting point: 167° C.

Owing to the fact that the color couplers according to the present invention contain a radical that makes them resistant to diffusion, they can be worked up without danger for so-called color fog into one of the water-permeable colloid layers of a photographic color material comprising different silver halide emulsion layers. These color couplers are added to a photographic silver halide emulsion, preferably while being dissolved in a solvent that is miscible with water, although they can also be dispersed in the emulsion according to a known technique while being dissolved in a high boiling lipophilic solvent. The binder of the light-sensitive silver halide emulsion can be any of the usual colloids such as gelatin, poly(vinyl alcohol), collodion, or other suited natural or synthetic colloids. The emulsion usually also comprises, i.a., optical sensitising agents, hardeners, stabilising agents and wetting agents for facilitating the coating and the adherence of the emulsion. The thus prepared silver halide emulsion can be coated as one of the layers of a one-layer or a multilayer color material. Suitable supports for such material are i.a. self-sustaining foils of paper, glass, transparent synthetic substances such as cellulose nitrate, cellulose triacetate, poly(ethylene terephthalate), polystyrene and so on. A photographic color material usually consists in the following sequence of an antihalation back layer, a transparent support, a red-sensitized silver halide emulsion layer comprising a color coupler for cyan, a green-sensitized silver halide emulsion layer comprising a color coupler for magenta, a yellow filter layer usually consisting of colloidal silver dispersed in gelatin, and a blue-sensitive silver halide emulsion layer comprising a color coupler for yellow.

The color couplers according to the present invention need not necessarily be provided in the silver halide emulsion layer, but they may also be incorporated into a colloid layer adjacent to a silver halide emulsion layer or into a colloid layer in water-permeable relationship therewith.

Suitable developing agents are aromatic amino compounds such as p - phenylenediamine, N,N - dialkyl - p-phenylenediamines such as N,N-diethyl-p-phenylenediamine and derivatives such as N,N-dialkyl-N'-sulphomethyl-p-phenylenediamines and N,N-dialkyl-N'-carboxymethyl-p-phenylenediamines.

When developing exposed silver halide with N,N-diethyl-p-phenylenediamine as developing agent in the presence of color couplers from the preparation examples, azomethine dyes with a maximum absorption at 570–560 mμ are obtained.

The following example further illustrates the invention.

EXAMPLE

A slightly alkaline solution of 9 g. of the color coupler prepared according to Preparation 3 in a mixture of 72 cc. of ethanol and water (1:3) and 18 cc. of sodium hydroxide is added to 500 g. of a green-sensitized silver bromoiodide emulsion containing ⅛ mole of silver halide. After acidifying with acetic acid to pH 6 and adding the usual additives such as hardeners, wetting agents and stabilising agents the emulsion is ready for coating. The resulting emulsion is worked up in a multilayer material consisting of the following superjacent layers: a support, an antihalation layer, an intermediate layer of gelatin, a red-sensitised silver halide emulsion layer containing a color coupler for cyan, an intermediate layer of gelatin, a layer of the above-mentioned green-sensitised emulsion containing the above described color coupler for magenta, a yellow filter layer, a blue-sensitive silver halide emulsion layer containing a color coupler for yellow and a protective layer of gelatin.

After exposure to a color original the photographic material is developed for 9 min. at 20° C. in a color developing bath of the following composition:

|  | G. |
|---|---|
| Sodium hexametaphosphate | 2 |
| N,N-diethyl-p-phenylenediamine hydrochloride | 3 |
| Anhydrous sodium sulphite | 4 |
| Anhydrous sodium carbonate | 57 |
| Hydroxylamine hydrochloride | 1.5 |
| Potassium bromide | 1 |
| Water to 1000 cc. (pH=10.6). | |

The photographic material is then rinsed for 30 min. at 18–20° C. and subsequently treated for 5 min. at 20° C. in a fixing bath of the following composition:

|  | G. |
|---|---|
| Anhydrous sodium thiosulphate | 200 |
| Anhydrous sodium bisulphite | 25 |
| Potassium alum | 20 |
| Equimolecular mixture of sodium acetate and acetic acid | 20 |
| Boric acid | 7.5 |
| Water to 1000 cc. (pH=4.0). | |

Then the material is rinsed for 10 min. at 18 to 20° C. and subsequently treated for 5 min. in a bleaching bath of the following composition:

|  | G. |
|---|---|
| Potassium hexacyanoferrate (III) | 100 |
| Potassium bromide | 15 |
| Borax | 20 |
| Magnesium sulphate | 50 |
| Water to 1000 cc. (pH=8.6). | |

The material is then rinsed for 10 min. at 18–20° C. and fixed at 20° C. for 5 min. in a bath of the following composition:

|  | G. |
|---|---|
| Sodium thiosulphate (anhydrous) | 130 |
| Borax | 20 |
| Magnesium sulphate | 50 |
| Water to 1000 cc. (pH=8.9). | |

Finally the material is rinsed for 10 min. at 18–20° C. and dried. The magenta dye image in the green-sensitized silver halide emulsion layer shows an absorption maximum of 570 mμ.

We claim:

1. A photographic color material comprising a silver halide emulsion containing a color coupler for magenta corresponding to the following general formula

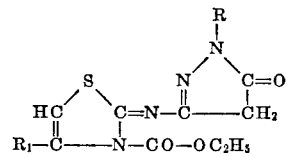

wherein:
R represents a member selected from the group consisting of a halogen-substituted phenyl radical, a phenoxy-substituted phenyl radical, an alkyl-substituted phenyl radical, and a N-dimethylsulphamoyl-substituted phenyl radical, and $R_1$ is $D(Z)_n$—$(Ar)_n$,
D is a linear carbon chain having from 5 to 20 carbon atoms,
Z is a member of the group selected from oxygen, sulphur, sulphonyl, —$SO_2NH$—, and —CONH—,
Ar is phenylene, and
$n$ is 1 or 0.

2. A photographic color material comprising in a green sensitized silver halide emulsion layer or in a water-permeable layer adjacent thereto a color coupler for magenta corresponding to the following general formula

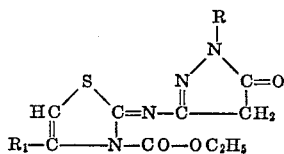

wherein:
R represents a member selected from the group consisting of a halogen-substituted phenyl radical, a phenoxy-substituted phenyl radical, an alkyl-substituted phenyl radical, and a N-dimethylsulphamoyl-substituted phenyl radical, and $R_1$ is $D(Z)_n$—$Ar_n$,
D is a linear carbon chain having from 5 to 20 carbon atoms,
Z is a member of the group selected from oxygen, sulphur, sulphonyl, —$SO_2NH$—, and —CONH—,
Ar is phenylene, and
$n$ is 1 or 0.

3. A photographic color material comprising a silver halide emulsion containing a color coupler for magenta corresponding to the following general formula:

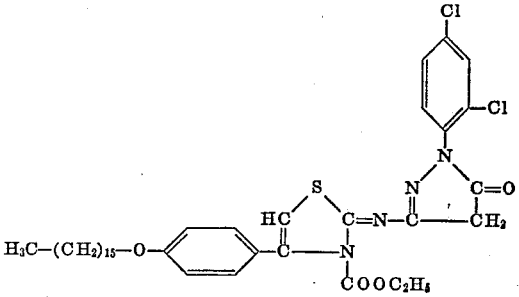

wherein:
R represents a member selected from the group consisting og a halogen-substituted phenyl radical, a phenoxy-substituted phenyl radical, an alkyl-substituted phenyl radical, and a N-dimethylsulphamoyl-substituted phenyl radical, and
D represents an aliphatic radical having from 5 to 20 carbon atoms in straight-line.

4. A photographic color material comprising a silver halide emulsion containing a color coupler for magenta corresponding to the following general formula:

References Cited
UNITED STATES PATENTS
2,619,419  11/1952  Jennen _____ 96—100
2,672,417  3/1954  Jennen _____ 96—100

J. TRAVIS BROWN, *Primary Examiner.*

U.S. Cl. X.R.

96—74